United States Patent [19]

Tsai

[11] Patent Number: 4,822,160
[45] Date of Patent: Apr. 18, 1989

[54] FLASHING SPECTACLES

[76] Inventor: James Tsai, Fl. 11, No. 40, Chang Chun Road, Taipei, Taiwan

[21] Appl. No.: 204,000

[22] Filed: Jun. 8, 1988

[51] Int. Cl.⁴ .............................................. G02C 1/00
[52] U.S. Cl. ....................................... 351/158; 351/41
[58] Field of Search .................. 351/41, 158; 362/103

[56] References Cited

U.S. PATENT DOCUMENTS 4,283,127  8/1981  Rosenwinkel ...................... 351/158

Primary Examiner—Rodney B. Bovernick
Attorney, Agent, or Firm—Morton J. Rosenberg

[57] ABSTRACT

This invention relates to a pair of flashing spectacles and in particular to one including a pair of spectacles, and an electrical device which has an external resistor for controlling frequency of the square waves generated by the oscillator, an on/off latch having an input connected with one and of a reset switch and an output connected with the oscillator and a counter, a decoder controller connected to output of the counter, an open drain driver connected with the decoder controller, a plurality of light emitting diodes connected with output of the open drain driver and a battery connected between output of the light emitting diodes and the other end of the reset switch whereby the light emitting diodes will emit light in turn when the reset switch is pressed once but will extinguish when the reset switch is further pressed.

1 Claim, 3 Drawing Sheets

FLASHING SPECTACLES

BACKGROUND OF THE INVENTION

It is found that spectacles have been invented for thousands of years for the purpose of helping the eyesight. Later, spectacles are modified to protect the eyes from bright sunlight and used for decoration. However, none of the spectacles on the market can cause people to think about high tecniques and outer space.

It is, therefore, an object of the present invention to provide a pair of spectacles which will emit flashing light thereby increasing fun as well as attracting attention of the others.

SUMMARY OF THE INVENTION

This invention relates to a kind of flashing spectacles.

It is the primary object of the present invention to provide a pair of flashing spectacles having at the upper part a plurality of light emitting diodes which will flash in turn thereby attracting the attention of the others.

It is still another object of the present invention to provide a pair of flashing spectacles which utilizes an integrated circuit to make the light emitting diodes flash in turn.

It is still another object of the present invention to provide a pair of flashing spectacles which is simple in construction.

It is still another object of the present invention to provide a pair of flashing spectacles which is economic to produce.

It is still another object of the present invention to provide a pair of flashing glasses which is facile to fabricate.

It is a further object of the present invention to provide a pair of flashing spectacles which is fit for mass production.

The novel features which are characteristics of the invention, together with further objects and advantages thereof will be better understood from the following description considered in connection with the accompanied drawings and in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
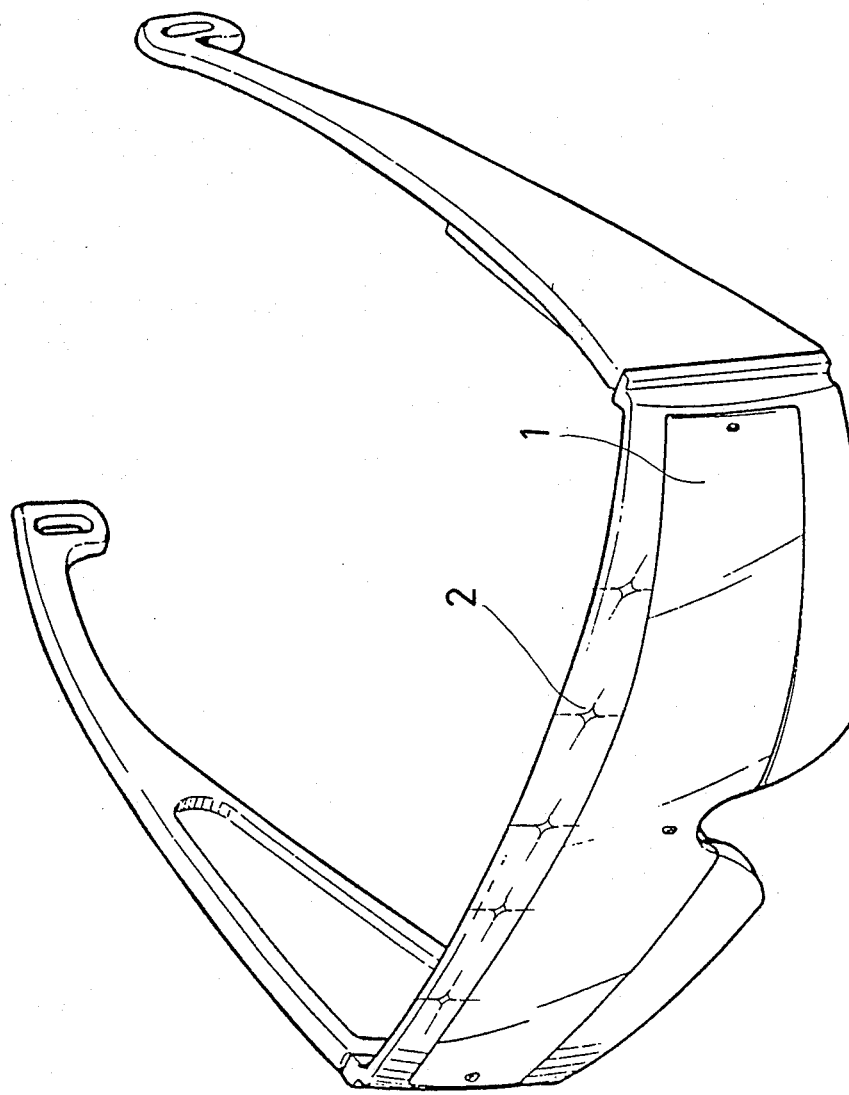
FIG. 1 is a perspective view of the flashing spectacles according to the present invention.

For purposes of promoting an understanding of the principles of the invention, reference will now be made to the embodiment illustrated in the drawings. It will, nevertheless, be understood that no limitation of the scope of the invention is thereby intended, such alternations and further modifications in the illustrated device, and such further applications as would normally occur to one skilled in the art to which the invention relates.

Figure 2:
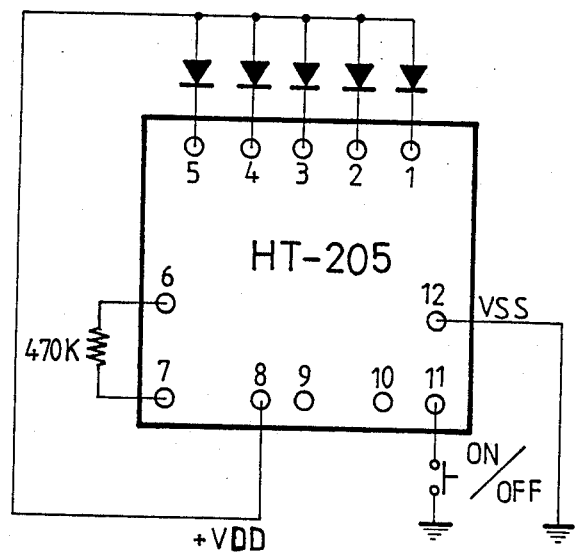
FIG. 2 shows the electrical circuit of the present invention.
Figure 3:
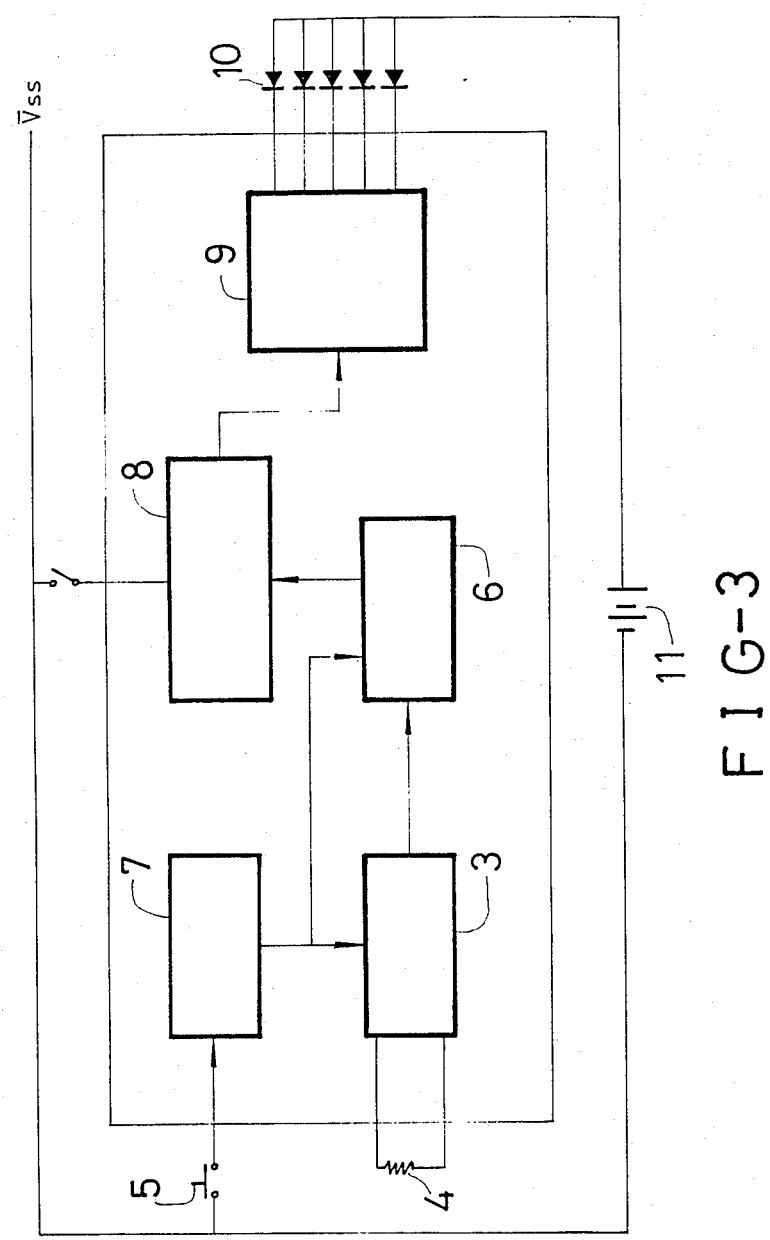
FIG. 3 is a block diagram of the electrical circuit of the present invention.

With reference to the drawings and in particular to FIG. 1 thereof, the flashing spectacles according to the present invention mainly comprises a pair of spectacles 1 and an electrical device 2 which is disposed in the upper part of the spectacles 1. As shown in FIGS. 2 and 3, the electrical device 2 includes an oscillator 3 for producing square waves, an external resistor 4 connected in parallel with the oscillator 3 for controlling the frequency of the square wave produced by the oscillator 3. The output of the oscillator 3 is connected to a counter 6. Only when the input of the oscillator 3 is at high potential will the electrical device 2 be in active state. In case the input of the oscillator is at low potential, the electrical device 2 will not work and will be at the condition of stand by state.

When the reset switch 5 is pressed, an on/off latch 7 connected between the reset switch 5 and the oscillator 3 will be actuated. As the electrical circuit is in active state and the reset switch is pressed once, the on/off latch 7 will turn off the electrical circuit and keep the electrical circuit at the condition of stand by state. This is to detect whether the rest switch 5 is further pressed or not. If the reset switch 5 is pressed again, the on/off latch will turn on the electrical circuit and make it in active state.

The output of the counter 6 is connected to the input of a decoder controller 8 which in turn connected to an open drain drive 9. The output of the open drain driver 9 is connected to a plurality of light emitting diodes 10. A battery is connected between Vss and Vdd.

As a consequence, once the reset switch is pressed, the light emitting diodes 10 will emit light in trun thereby increasing fun as well as attraction to the others' attention. When the reset switch is further pressed, the light emitting diodes will extinguish.

Although this invention has been described with a certain degree of particularity, it is understood that the present disclosure is made by way of example only and that numerous changes in the construction and the combination and arrangement of parts may be resorted to without departing from the spirit and scope of the invention as hereinafter claimed.

I claim:

1. A pair of flashing spectacles comprising:
   a pair of spectacles; and
   an electrical device including an oscillator for producing square waves, an external resistor connected in parallel with the oscillator for controlling frequency of the square waves produced by the oscillator, said oscillator having an output connected to a counter, an on/off latch having an input connected with one end of a rest switch and an output connected with the oscillator and the counter, a decoder controller connected to output of the counter, an open drain driver connected with the decoder controller, a plurality of light emitting diodes connected with output of the open drain driver and a battery connected between output of the light emitting diodes and the other end of the reset switch;
   whereby the light emitting diodes will emit light when the reset switch is pressed once but will extinguish when the reset switch is further pressed.

* * * * *